(12) United States Patent
Song et al.

(10) Patent No.: US 9,972,305 B2
(45) Date of Patent: May 15, 2018

(54) APPARATUS AND METHOD FOR NORMALIZING INPUT DATA OF ACOUSTIC MODEL AND SPEECH RECOGNITION APPARATUS

(71) Applicant: Samsung Electronics Co., Ltd., Suwon-si (KR)

(72) Inventors: In Chul Song, Suwon-si (KR); Young Sang Choi, Seongnam-si (KR); Hwi Dong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/286,999

(22) Filed: Oct. 6, 2016

(65) Prior Publication Data

US 2017/0110115 A1 Apr. 20, 2017

(30) Foreign Application Priority Data

Oct. 16, 2015 (KR) .......................... 10-2015-0144947

(51) Int. Cl.
| | |
|---|---|
| *G10L 15/00* | (2013.01) |
| *G10L 15/02* | (2006.01) |
| *G10L 15/16* | (2006.01) |
| *G10L 21/04* | (2013.01) |
| *G10L 25/45* | (2013.01) |

(52) U.S. Cl.
CPC .............. *G10L 15/02* (2013.01); *G10L 15/16* (2013.01); *G10L 21/04* (2013.01); *G10L 25/45* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 5,093,899 A | 3/1992 | Hiraiwa | |
| 5,502,790 A | 3/1996 | Yi | |
| 5,668,926 A | 9/1997 | Karaali et al. | |
| 5,903,863 A | 5/1999 | Wang | |
| 5,913,194 A | 6/1999 | Karaali et al. | |
| 6,041,299 A | 3/2000 | Schuster et al. | |
| 6,173,258 B1 | 1/2001 | Menendez-Pidal et al. | |
| 6,308,155 B1 | 10/2001 | Kingsbury et al. | |
| 6,317,710 B1 | 11/2001 | Huang et al. | |

(Continued)

FOREIGN PATENT DOCUMENTS

| | | |
|---|---|---|
| JP | 2699447 B2 | 1/1998 |
| JP | 2005-208648 A | 8/2005 |

(Continued)

OTHER PUBLICATIONS

Extenede European Search Report dated Mar. 15, 2017 in counterpart European Patent Application No. 16193988.9 (15 pages, in English).

(Continued)

*Primary Examiner* — Jesse Pullias
(74) *Attorney, Agent, or Firm* — NSIP Law (57) ABSTRACT

An apparatus for normalizing input data of an acoustic model includes a window extractor configured to extract windows of frame data to be input to an acoustic model from frame data of a speech to be recognized, and a normalizer configured to normalize the frame data to be input to the acoustic model in units of the extracted windows.

23 Claims, 10 Drawing Sheets

(56) References Cited

U.S. PATENT DOCUMENTS

| | | |
|---|---|---|
| 6,453,284 B1 | 9/2002 | Paschall |
| 6,947,890 B1 | 9/2005 | Kitazoe et al. |
| 6,999,920 B1 | 2/2006 | Matt et al. |
| 7,480,615 B2 | 1/2009 | Attias et al. |
| 7,496,548 B1 | 2/2009 | Ershov |
| 8,527,276 B1 | 9/2013 | Senior et al. |
| 8,725,498 B1 | 5/2014 | Sung et al. |
| 9,153,231 B1* | 10/2015 | Salvador ............... G10L 15/065 |
| 9,466,292 B1* | 10/2016 | Lei ........................ G10L 15/16 |
| 9,600,231 B1* | 3/2017 | Sun ....................... G06F 3/167 |
| 9,613,624 B1* | 4/2017 | Kramer .................. G10L 15/08 |
| 9,653,093 B1* | 5/2017 | Matsoukas .............. G10L 15/08 |
| 9,666,203 B2 | 5/2017 | Franck et al. |
| 2003/0204398 A1 | 10/2003 | Haverinen et al. |
| 2006/0178880 A1 | 8/2006 | Zhang et al. |
| 2011/0218803 A1 | 9/2011 | Ketabdar et al. |
| 2013/0332148 A1 | 12/2013 | Ravelli et al. |
| 2014/0348337 A1 | 11/2014 | Franck et al. |
| 2015/0095027 A1 | 4/2015 | Parada San Martin et al. |
| 2015/0127594 A1 | 5/2015 | Parada San Martin et al. |
| 2015/0161522 A1 | 6/2015 | Saon et al. |
| 2016/0171974 A1 | 6/2016 | Hannun et al. |
| 2016/0217367 A1 | 7/2016 | Moreno et al. |
| 2016/0379629 A1* | 12/2016 | Hofer ................... G06F 17/277 704/257 |

FOREIGN PATENT DOCUMENTS

| | | |
|---|---|---|
| KR | 10-0202424 B1 | 6/1999 |
| KR | 10-2004-0100592 A | 12/2004 |
| WO | WO 00/14724 | 3/2000 |

OTHER PUBLICATIONS

Alex Graves, et al., "Speech Recognition with Deep Recurrent Neural Networks," *Proceedings from the International Conderence on Acoustics, Speech, and Signal Processing*, May 26-31, 2013, ICASSP 2013, pp. 6645-6649. (6 pages, in English).

Collobert, Ronan, et al. "Natural Language Processing (almost) from Scratch." *The Journal of Machine Learning Research*, (http://arxiv.org/abs/1103.0398), 2011, (47 pages, in English).

Extended European Search Report dated Oct. 14, 2016, in counterpart European Application No. 16180760.7 (8 pages, in English).

Hasim Sak, et al., "Long Short-Term Memory Recurrent Neural Network Architectures for Large Scale Acoustic Modeling", *Interspeech* 2014, Sep. 14-18, 2014, Singapore, pp. 338-342. (5 page, in English).

Santos, José. "Codon Based Amino Acid Encoding for the Neural Network Prediction of Protein Secondary Structure." *5th Annual Spanish Bioinformatics Conference*, 2004, (101-106). (6 pages, in English).

Xin Lei, et al., "Accurate and Compact Large Vocabulary Speech Recognition on Mobile Devices," *Proceeding from the Interspeech*, Aug. 25, 2013, pp. 662-665. (4 pages, in English).

M. Schuster, et al. "Bidirectional Recurrent Neural Networks." *IEEE Transactions on Signal Processing*, vol. 45, No. 11, Nov. 1997. pp. 2673-2681.

A. Graves, et a. "Hybrid Speech Recognition With Deep Bidirectional LSTM." *IEEE Workshop on Automatic Speech Recognition and Understanding (ASRU)*, Dec. 12, 2013. pp. 273-278.

European Search Report issued by the European Patent Office (EPO) dated Nov. 30, 2016 in counterpart International Application No. 16193988.9 (9 pages).

Pan, Jia, et al. "Investigation of deep neural networks (DNN) for large vocabulary continuous speech recognition: Why DNN surpasses GMMs in acoutstic modeling." Chinese Spoken Language Processing (ISCSLP), 2012 8th International Symposium on. IEEE, 2012.

Viikki, Olli, and Kari Laurila. "Cepstral domain segmental feature vector normalization for noise robust speech recognition." Speech Communication 25.1 (1998): 133-147.

Sahar E. Bou-Ghazale, et al., "Hands-Free Voice Activation of Personal Communication Devices," *Proceedings of IEEE International Conference on Acoustics, Speech, and Signal Processing*, vol. 3, Aug. 2000, pp. 1735-1738.

Jan Chorowski, et al., "End-to-end Contiuous Speech Recognition using Attention-based Recurrent NN: First Result," *Proceedings of the NIPS Workshop on Deep Learning*, Dec. 2014, pp. 1-10.

Awni Hannun, et al., "Deep Speech: Scaling up end-to-end speech recognition," *Computation and Language; Learning; Neural and Evolutionary Computing*, arXiv:1412.5567, Dec. 2014, pp. 1-12.

Andrew L. Maas, et al., Lexicon-Free Conversational Speech recognition with Neural Networks,: *Proceedings of the Annual Conference of the North American Chapter of the ACL*, May-Jun. 2015, pp. 345-354.

Kai Chen, et al, "A Context-Sensitive-Chunk BPTT Approach to Training Deep LSTM/BLSTM Recurrent Neural Networks for Offline Handwriting Recognition," *Proceedings of the 13th International Conference on Document Analysis and Recognition*, Aug. 2015, pp. 411-415.

Chen Z., et al., "Integration of Speech Enhancement and Recognition using Long-Short Term Memory Recurrent Neural Network," *Proceedings of Interspeech*, Sep. 2015, pp. 1-7.

United States Office Action dated Jun. 1, 2017, in corresponding U.S. Appl. No. 15/187,428 (3 pages, in English).

United States Final Office Action dated Nov. 9, 2017, in corresponding U.S. Appl. No. 15/187,428 (2 pages, in English).

\* cited by examiner

FIG. 7

APPARATUS AND METHOD FOR NORMALIZING INPUT DATA OF ACOUSTIC MODEL AND SPEECH RECOGNITION APPARATUS

CROSS-REFERENCE TO RELATED APPLICATIONS

This application claims the benefit under 35 USC 119(a) of Korean Patent Application No. 10-2015-0144947 filed on Oct. 16, 2015, in the Korean Intellectual Property Office, the entire disclosure of which is incorporated herein by reference for all purposes.

BACKGROUND

1. Field

The following description relates to technology for normalizing input data of an acoustic model for gradual decoding in speech recognition.

2. Description of Related Art

In general, a speech recognition engine consists of an acoustic model, a language model, and a decoder. The acoustic model calculates pronunciation-specific probabilities for each frame of an input speech signal, and the language model provides information on how frequently a specific word or sentence is used. The decoder calculates which word or sentence is similar to an input speech based on the information provided by the acoustic model and the language model, and outputs the calculation result. A Gaussian mixture model (GMM) acoustic model has been generally used, and speech recognition performance is improving lately with the advent of a deep neural network (DNN) acoustic model. A bidirectional recurrent deep neural network (BRDNN) calculates pronunciation-specific probabilities for each frame of a speech in consideration of bidirectional information, that is, preceding and subsequent frame information, and thus receives the speech as a whole. When each frame of a speech signal input during model training is represented as an N-dimensional vector, a BRDNN acoustic model performs normalization so that each dimensional value of the vector is within a specific range. While normalization may be generally performed based on whole training data or each utterance, the BRDNN acoustic model performs normalization in units of utterances.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, an apparatus for normalizing input data of an acoustic model includes a window extractor configured to extract windows of frame data to be input to the acoustic model from frame data of a speech to be recognized; and a normalizer configured to normalize the frame data to be input to the acoustic model in units of the extracted windows.

The window extractor may be further configured to consecutively extract the windows in units of a predetermined number of frames of the frame data of the speech to be recognized while the frame data of the speech to be recognized is being input.

The normalizer may be further configured to normalize frames belonging to a current window together with padding frames added to both sides of the current window.

The normalizer may be further configured to normalize frames belonging to a current window in consideration of frames belonging to preceding windows of the current window.

The normalizer may be further configured to normalize the frames belonging to the current window in consideration of the frames belonging to the preceding windows and frames of training data in response to a total number of the frames belonging to the current window and the frames belonging to the preceding windows being insufficient for speech recognition.

The normalizer may be further configured to acquire a number of frames corresponding to a difference between the total number of the frames and a reference value from the training data in response to the total number of the frames being less than the reference value.

The normalizer may be further configured to normalize the frame data belonging to the extracted windows so that the frame data belonging to the extracted windows has an average of 0 and a standard deviation of 1.

In another general aspect, a method of normalizing input data of an acoustic model includes extracting windows of frame data to be input to the acoustic model from frame data of a speech to be recognized; and normalizing the frame data to be input to the acoustic model in units of the extracted windows.

The extracting of the windows may include consecutively extracting the windows in units of a predetermined number of frames of the frame data of the speech to be recognized while the frame data of the speech to be recognized is being input.

The normalizing of the frame data may include normalizing frames belonging to a current window together with padding frames added to both sides of the current window.

The normalizing of the frame data may include normalizing frames belonging to a current window in consideration of frames belonging to preceding windows of the current window.

The normalizing of the frame data may include normalizing the frames belonging to the current window in consideration of the frames belonging to the preceding windows and frames of training data in response to a total number of the frames belonging to the current window and the frames belonging to the preceding windows being insufficient for speech recognition.

The normalizing of the frame data may include comparing the total number of the frames belonging to the current window and the preceding windows with a reference value in response to the current window being extracted; and acquiring a number of frames corresponding to a difference between the total number of the frames and the reference value from the training data in response to the total number of the frames being less than the reference value.

The normalizing of the frame data may include normalizing the frame data belonging to the extracted windows so that the frame data belonging to the extracted windows has an average of 0 and a standard deviation of 1.

In another general aspect, a non-transitory computer-readable medium stores instructions that, when executed by a processor, cause the processor to perform the method described above.

In another general aspect, a speech recognition apparatus includes a preprocessor configured to extract windows of frame data to be input to an acoustic model from frame data of a speech to be recognized, and normalize the frame data to be input to the acoustic model in units of the extracted windows; an acoustic score calculator configured to calculate acoustic scores in units of the normalized windows using the acoustic model based on a deep neural network (DNN); and an interpreter configured to interpret the acoustic scores calculated in units of the normalized windows, and output a recognition result of the speech to be recognized based on the interpreted scores.

The preprocessor may be further configured to normalize frames belonging to a current window in consideration of frames belonging to preceding windows of the current window.

The preprocessor may be further configured to normalize the frames belonging to the current window in consideration of the frames belonging to the preceding windows and frames of training data in response to a total number of the frames belonging to the current window and the frames belonging to the preceding windows being insufficient for speech recognition.

The interpreter may be further configured to output a recognition result of the current window as a final recognition result of a whole speech to be recognized in response to a predetermined condition being satisfied or an input of a user while input of the speech to be recognized is under way.

The DNN may be a bidirectional recurrent deep neural network (BRDNN).

The speech recognition apparatus may further include a language score calculator configured to calculate language scores using a language model; and the interpreter may be further configured to output the recognition result based on the interpreted scores and the language scores.

In another general aspect, an apparatus for normalizing input data of an acoustic model includes a window extractor configured to extract windows of frame data to be input to the acoustic model from frame data of a speech to be recognized; and a normalizer configured to normalize the frame data to be input to the acoustic model based on a sufficient amount of frame data to enable speech recognition.

The normalizer may be further configured to normalize the frame data based on frames of all of the extracted windows from a first extracted window to a current extracted window.

The normalizer may be further configured to normalize the frame data based on frames of all of the extracted windows from a first extracted window to a current extracted window and frames of training data.

A number of the frames of the training data may be equal to a difference between a total number of the frames of all of the extracted windows from the first extracted window to the current extracted window and a reference value denoting a minimum number of frames to enable speech recognition.

The normalizer may be further configured to normalize frames of a current extracted window each time a window is extracted.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions and depiction of elements in the drawings may be exaggerated for clarity, illustration, and convenience.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
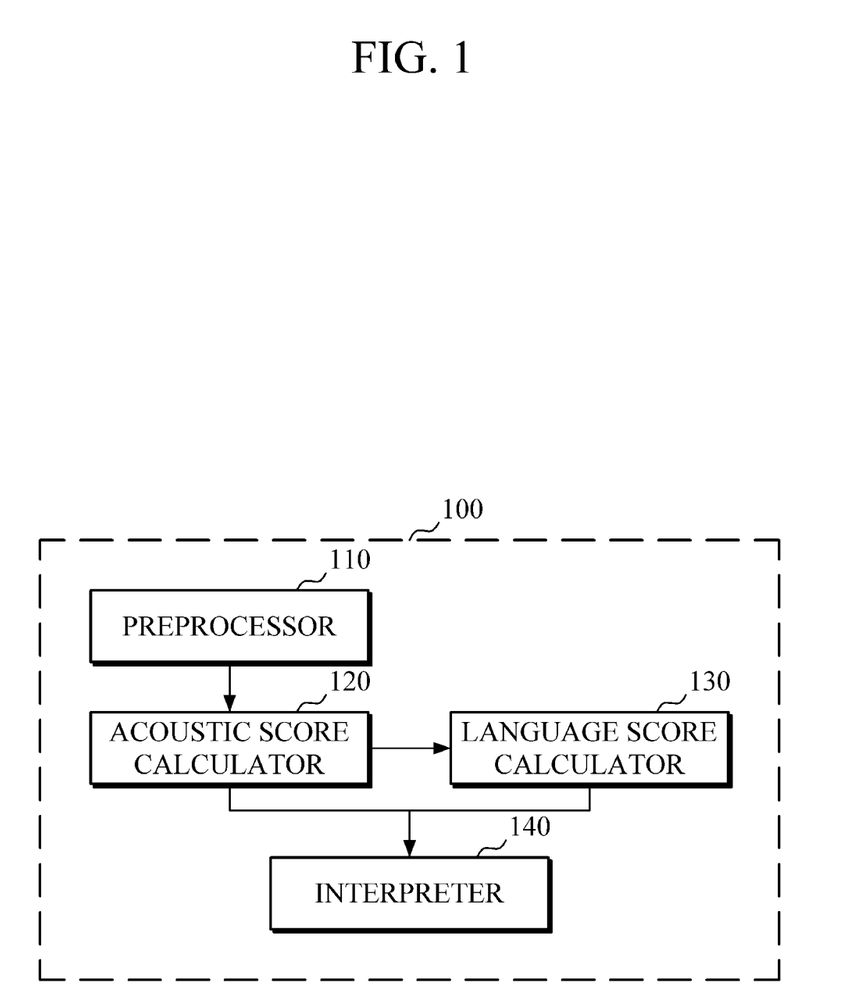
FIG. 1 is a block diagram of an example of a speech recognition apparatus.

FIG. 1 is a block diagram of an example of a speech recognition apparatus. A speech recognition apparatus 100 may be implemented as an independent hardware device that outputs a speech recognition result of an input speech signal, or may be installed as a hardware module in an electronic device that performs various functions (e.g., translation or interpretation of the input speech signal into another language, Television (TV) control, vehicle cruise control, or navigation control) using a speech recognition result.

Referring to FIG. 1, the speech recognition apparatus 100 includes a preprocessor 110, an acoustic score calculator 120, a language score calculator 130, and an interpreter 140. Each of the elements 110, 120, 130, and 140 of the speech recognition apparatus 100 may be implemented separately or in combination with one or more other elements. For example, the preprocessor 110 may be implemented as a separate normalization apparatus 200 as will be described below with reference to FIG. 2.

When a speech signal to be recognized is input, the preprocessor 110 performs a pre-processing operation for speech recognition.

For example, when the input speech signal is an analog signal, the preprocessor converts the analog signal into a digital signal, and divides the digital signal into a plurality of speech frames. In one example, a speech signal corresponding to one second is divided into 100 frames. Using data of the divided speech frames, the preprocessor 110 extracts windows to be input to an acoustic model. The preprocessor 110 does not wait until the whole speech signal is input, but extracts a window each time a number of frames corresponding to a window size are input while the speech signal is being input.

A window is a unit of frame data to be input to an acoustic model, and a window size is a number of frames to be included in a window, and may be set to a value less than the total number of frames of the speech signal to be recognized. The window size may be set and adjusted based on an application field of speech recognition, the computing performance of an apparatus, and other factors. For example, when the application field of speech recognition is translation or interpretation, accuracy may be more important than speed, and the window size may be set to be relatively large. In contrast, when the application field of speech recognition is to process commands embedded in an apparatus such as a TV or other device, the number of commands related to the apparatus is limited, and it may be more important to rapidly process a command. Therefore, the window size may be set to be relatively small.

When windows for inputting frame data to an acoustic model are extracted in this way, the preprocessor 110 performs normalization in units of the extracted windows. In other words, every time a window is extracted, the preprocessor 110 normalizes the frames belonging to the extracted window.

The acoustic score calculator 120 calculates acoustic scores in units of the extracted windows using an acoustic model. The acoustic model may be any one of various deep neural network (DNN) acoustic models, for example, a bidirectional recurrent deep neural network (BRDNN) acoustic model. When a window is extracted and frames belonging to the window are normalized by the preprocessor 110, the acoustic score calculator 120 calculates acoustic scores by inputting the normalized frames into the acoustic model. The acoustic scores may be pronunciation-specific probabilities. However, units for calculating scores are not limited to pronunciations, but may be any one of various language recognition units including, for example, phonemes, morphemes, words, phrases, and sentences.

The preprocessor 110 may add padding frames to both sides of extracted windows so that the acoustic score calculator 120 may calculate acoustic scores more accurately. It is possible to set in advance whether or not to add padding frames and the number of padding frames to be added. When extracting a current window and adding padding frames, the preprocessor 110 assumes that the added padding frames also belong to the window, and normalizes the frames of the window and the added padding frames together.

When set to add padding frames, the preprocessor 110 may add one or more left frames adjacent to the first frame of the current window and one or more right frames adjacent to the last frame of the current window. No padding frames are added to the left of the first window and the right of the last window. For example, if two padding frames are to be added, and the current window is a first window including frames 1, 2, 3, and 4, no frames are added to the left of the current window, and frames 5 and 6 are added to the right of the current window. If the current window is a second window including frames 5, 6, 7, and 8, frames 3 and 4 are added to the left of the current window, and frames 9 and 10 are added to the right of the current window. If the current window is a last window including frames 13, 14, 15, and 16, frames 11 and 12 are added to the left of the current window, and no frames are added to the right of the current window.

When padding frames are added to windows, the acoustic score calculator 120 calculates acoustic scores by inputting together frames of the windows and the added padding frames to the DNN acoustic model. The DNN acoustic model may be a BRDNN acoustic model. Based on an acoustic score calculated for a padding frame added to a preceding window, the acoustic score calculator 120 may calculate an acoustic score for a frame of the current window overlapping the padding frame. In this case, the acoustic score calculator 120 may use an average of acoustic scores calculated for the overlapping frame of the current window and the padding frame, or an average of values obtained by weighting the acoustic scores as the acoustic score for the overlapping frame of the current window.

For example, assume that the frames of the preceding window are frames 9, 10, 11, and 12, that frames 7 and 8 were added to the left of frame 9 as padding frames of the preceding window, and that frames 13 and 14 were added to the right of frame 12 as padding frames of the preceding window. Assume that the frames of the current window are frames 13, 14, 15, and 16. Thus, frame 13 of the current window overlaps padding frame 13 of the preceding window. The acoustic score calculator 120 may use an average of the acoustic scores calculated for frame 13 of the current window and padding frame 13 of the previous window according to the equation $Y=(a+b)/2$, where Y is a recalculated acoustic score of frame 13 of the current window, a is the acoustic score of padding frame 13 of the preceding window, and b is the acoustic score of frame 13 of the current window. Alternatively, the acoustic score calculator 120 may use an average of values obtained by weighting the acoustic scores calculated for frame 13 of the current window and padding frame 13 of the previous window according to the equation $Y=((1-\alpha)a+\alpha b)/2$, where Y is a recalculated acoustic score of frame 13 of the current window, $\alpha$ is a weight value ($0 \leq \alpha \leq 1$), a is the acoustic score of padding frame 13 of the preceding window, and b is the acoustic score of frame 13 of the current window.

The language score calculator 130 outputs information on words, sentences, and other parts of speech, for example, language scores regarding the frequency of word or sentence use, using a language model and the acoustic scores calculated by the acoustic score calculator 120. The language model may be an n-gram language model or a neural network language model.

The interpreter 140 interprets acoustic scores and language scores output from the acoustic score calculator 120 and the language score calculator 130 in units of windows using various interpretation techniques, and outputs recognition results in units of windows. In other words, when acoustic scores and language scores of the current window are calculated, the interpreter 140 outputs results of recognizing the whole speech based on the acoustic scores and language scores of the current window without having to wait for acoustic scores and language scores of the last window. Although FIG. 1 shows that the acoustic score calculator 120 has two outputs, one to the language score calculator 130 and the other to the interpreter 140, this is merely for convenience of illustration, and the same acoustic scores calculated by the acoustic score calculator 120 are output to both the language score calculator 130 and the interpreter 140.

When a recognition result of the current window satisfies a predetermined condition or there is an input of a user, the interpreter 140 may output the recognition result of the current window as a final recognition result of the whole speech signal. The predetermined condition may be the number of extracted windows or a threshold value of a recognition result. However, these are only examples, and the predetermined condition is not limited to these examples. For example, when rapid speech recognition is required, a relatively small number of extracted windows (e.g., 2) may be set as the predetermined condition. In this case, when a recognition result of the second window is output, the interpreter 140 may output the recognition result up to the second window as a final recognition result of the whole speech signal to be recognized. As another example, if a probability of using a specific word/sentence is greater than a predetermined threshold value (e.g., 70%) as of the second window, the interpreter 140 may output the recognition result up to the second window as a final recognition result of the whole speech signal to be recognized.

Figure 2:
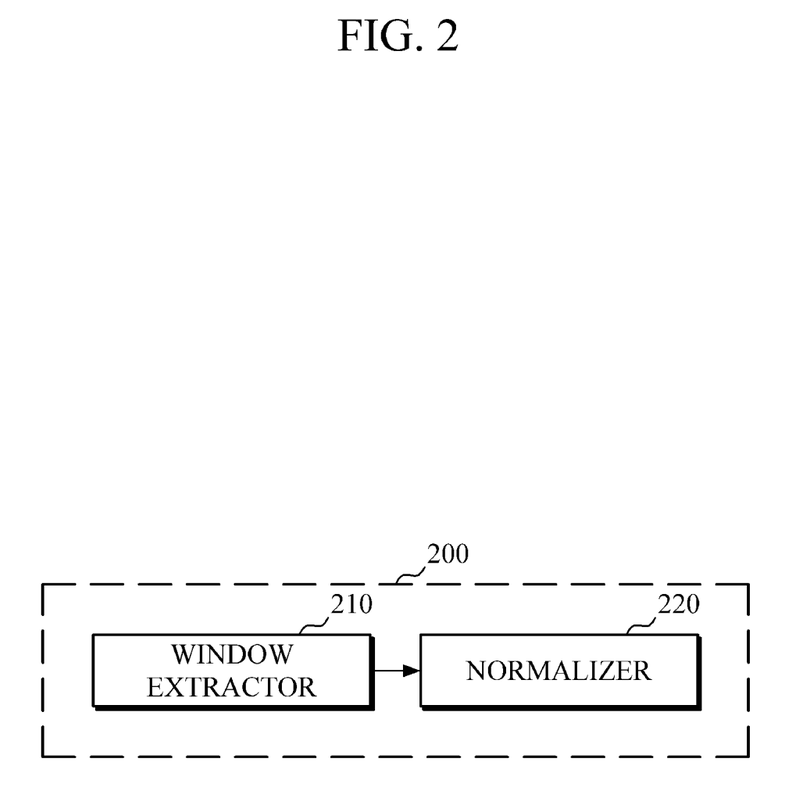
FIG. 2 is a block diagram of an example of a normalization apparatus.

FIG. 2 is a block diagram of an example of a normalization apparatus. The normalization apparatus 200 is an example of the preprocessor 110 of FIG. 1, and a method of extracting input data of an acoustic model and normalizing the input data required for gradual decoding will be described in further detail.

Referring to FIG. 2, the normalization apparatus 200 includes a window extractor 210 and a normalizer 220.

When input of speech frame data of a speech signal to be recognized proceeds, the window extractor 210 sequentially extracts windows which are frame data to be input to an acoustic model in units of preset window size without waiting until all frames are input.

For example, when the number of speech frames of a speech signal to be recognized is N and a set window size is K, the window extractor 210 waits until the first to K-th frames have been input, extracts the first to K-th frames as the first window when the K-th frame is input, and extracts the (K+1)-th to 2K-th frames as the second window when the 2K-th frame is input. Such a process is repeatedly performed until the N-th frame is input.

Also, when a window is extracted, the window extractor 210 may add padding frames to both sides of the extracted window. In other words, it is possible to add padding frames to the window so that an accurate acoustic score may be calculated using a BRDNN acoustic model. Whether or not to add padding frames and the number of padding frames to be added may be set in advance. A padding frame added to a specific window may be used together with the frames of the window in calculating an acoustic score of the window, and may also be used in calculating an acoustic score of another window.

When the windows to be input to an acoustic model are sequentially extracted by the window extractor 210, the normalizer 220 performs normalization in units of the extracted windows. When a current window is extracted and padding frames have been added to the current window, the normalizer 220 considers the added padding frames as frames belonging to the current window, and performs normalization based on the frames of the current window and the added padding frames.

In one example, the normalizer 220 normalizes each frame belonging to the current window in consideration of information of frames belonging to preceding windows of the current window according to Equation 1 below. Assuming that the last frame of the current window is an L-th frame, that is, a total of L frames have been extracted from the first to current windows, and the extracted frames are expressed by d-dimensional vectors x, a value x[d] of the vector x in each dimension d are normalized as x̂[d] so that the distribution of the values x[d] has an average M(d) of 0 and a standard deviation SD(d) of 1. Here, $x_i$ denotes a value of an i-th frame, and when padding frames have been added to the right of the current window, L is the sum of the number of the last frame of the current window and the number of padding frames that have been added to the right of the current window. For example, if the number of last frame of the current window is 16 and 2 padding frames have been added to the right of the current window, L=16+2=18.

$$\hat{x}[d] = \frac{(x[d] - M(d))}{SD(d)} \quad (1)$$

$$M(d) = \frac{1}{L}\sum_{i=1}^{L} x_i[d]$$

$$SD(d) = \sqrt{\frac{1}{L}\sum_{i=1}^{L} (x_i[d] - M(d))^2}$$

Figure 3:
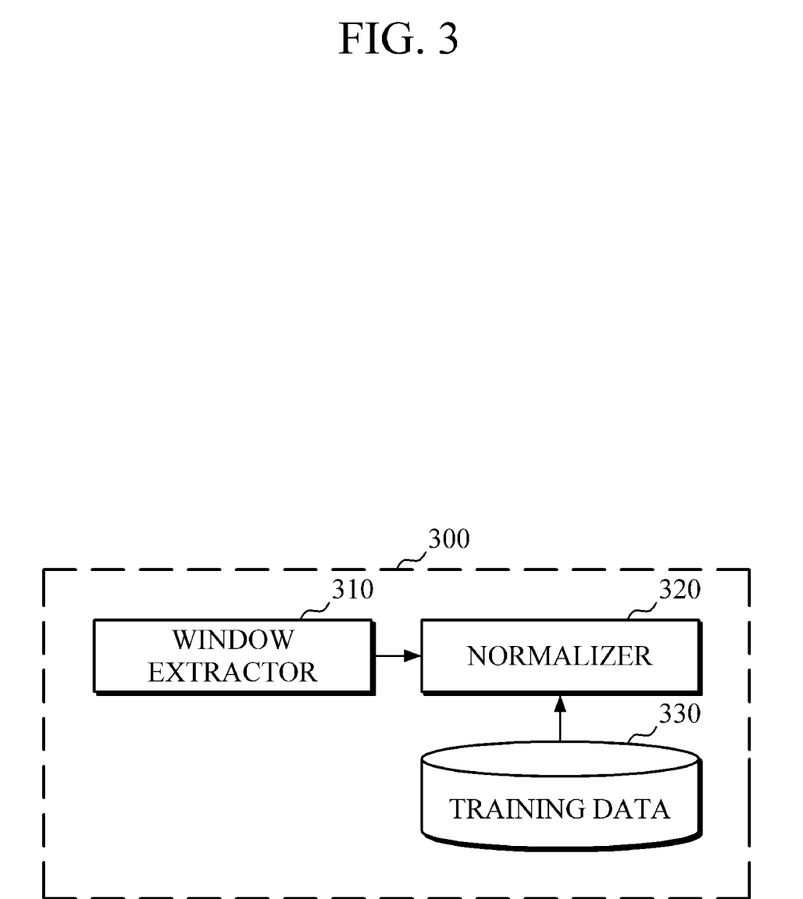
FIG. 3 is a block diagram of another example of a normalization apparatus.

FIG. 3 is a block diagram of another example of a normalization apparatus.

Referring to FIG. 3, a normalization apparatus 300 includes a window extractor 310, a normalizer 320, and training data 330. The window extractor 310 and the normalizer 320 are basically the same as the elements 210 and 220 described above with reference to FIG. 2, and thus only the differences between these elements will be described. The training data 330 may be stored in any type of memory or other storage device, and may be training data that was used to train the acoustic model included in the acoustic score calculator 120 in FIG. 1. The training data may be obtained in a field to which the speech recognition apparatus 100 in FIG. 1 is applied. Therefore, the input speech signal input to the speech recognition apparatus 100 may be a phrase included in the training data 330.

In this example, the normalizer 320 normalizes respective frames belonging to a current window in consideration of frames belonging to preceding windows of the current window and the training data 330 according to Equation 2 below. Specifically, when a current window is extracted, the normalizer 320 determines whether the total number of frames that have been extracted from the first frame of the first window to the last frame of the current window is sufficient to enable accurate speech recognition, and takes the training data 330 into consideration when the total number of frames is insufficient to enable accurate speech recognition.

For example, when a current window is extracted, the normalizer 320 compares a total number L of frames that have been extracted from the first frame of the first window to the last frame of the current window with a preset reference value G. When the total number L of extracted frames is less than the reference value G, the normalizer 320 acquires a number of frames needed to enable accurate speech recognition, for example, a number of frames equal to a difference G−L between the reference value G and the total number L of extracted frames, from the training data 330, and takes the acquired frames into consideration when normalizing the frames of the current window.

To this end, the equations of the average M(d) and the standard deviation SD(d) in Equation 1 may be modified as shown in Equation 2 below.

$$M(d) = \frac{1}{G}\left(\sum_{i=1}^{L} x_i[d] + \frac{G-L}{N}\sum_{j=1}^{N} x_j[d]\right) \quad (2)$$

$$SD(d) = \sqrt{\frac{1}{G} \sum_{i=1}^{L} \left( x_i[d]^2 + \frac{G-L}{N} \sum_{j=1}^{N} x_j[d]^2 \right) - (M(d))^2}$$

Here, $x_j$ denotes a value of a j-th frame of training data, and N denotes a total number of frames of the training data.

When calculating the average M(d) and the standard deviation SD(d) in consideration of training data as shown in Equation 2, the normalizer 320 normalizes x[d] as x̂[d] by inserting the calculated average and standard deviation into the first equation of Equation 1.

According to the examples of FIGS. 2 and 3, even when only some of all frames to be recognized are input to an acoustic model for gradual decoding, accurate speech recognition is possible. In other words, according to the examples, even when normalization is performed on frames that are insufficient to enable accurate speech recognition, such as the first window or the second window, frames that are sufficient to enable accurate speech recognition are taken into consideration. Therefore, when the insufficient frames do not correspond to a speech of a user, it is possible to prevent the insufficient frames from being misrecognized as the speech of the user.

However, the normalization is not limited to the examples of FIGS. 2 and 3. When a sufficient number of frames belong to a current window, for example, when a window size has been set to be large enough for accurate speech recognition, it is also possible to perform normalization using only information on the frames belonging to the current window without considering frames of preceding windows or frames of training data.

FIGS. 4A to 4D are diagrams illustrating examples of a normalization method. Examples in which normalization is performed will be described by examples with reference to FIGS. 2 to 4D. First, it is assumed that a total number of frames of a speech signal to be recognized is 18 and a window size is 4.

Figure 4A:
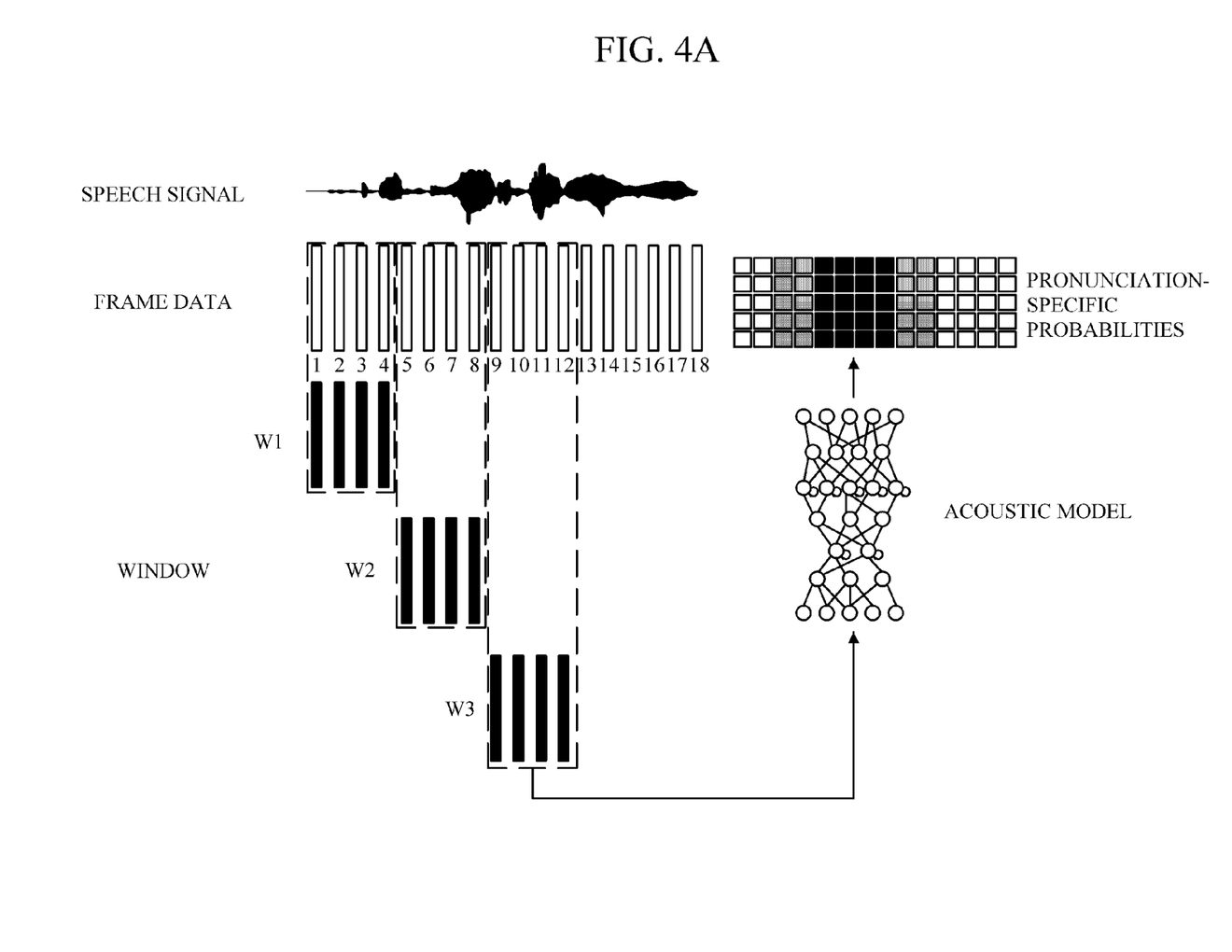
FIGS. 4A to 4D are diagrams illustrating an example of a normalization method.

FIG. 4A shows an example of extracting a window to be input to an acoustic model from frame data of a speech signal to be recognized. When frame data of the speech signal is sequentially input beginning with frame 1, the window extractor 210 or 310 waits until frame 4 is input and the window size of 4 is satisfied, and extracts a first window W1 when frame 4 is input. Subsequently, when frames are input up to frame 8, the window extractor 210 or 310 extracts frames 5 to 8 as a second window W2. The window extractor 210 or 310 repeats this process until all the frames of the speech signal to be recognized are input. In this example, the last window does not have four frames because the total number of frames of 18 is not an integer multiple of the window size of 4. As described above, the extracted windows are sequentially input to an acoustic model, and acoustic scores, for example, pronunciation-specific probabilities, are calculated in units of the windows.

Figure 4B:
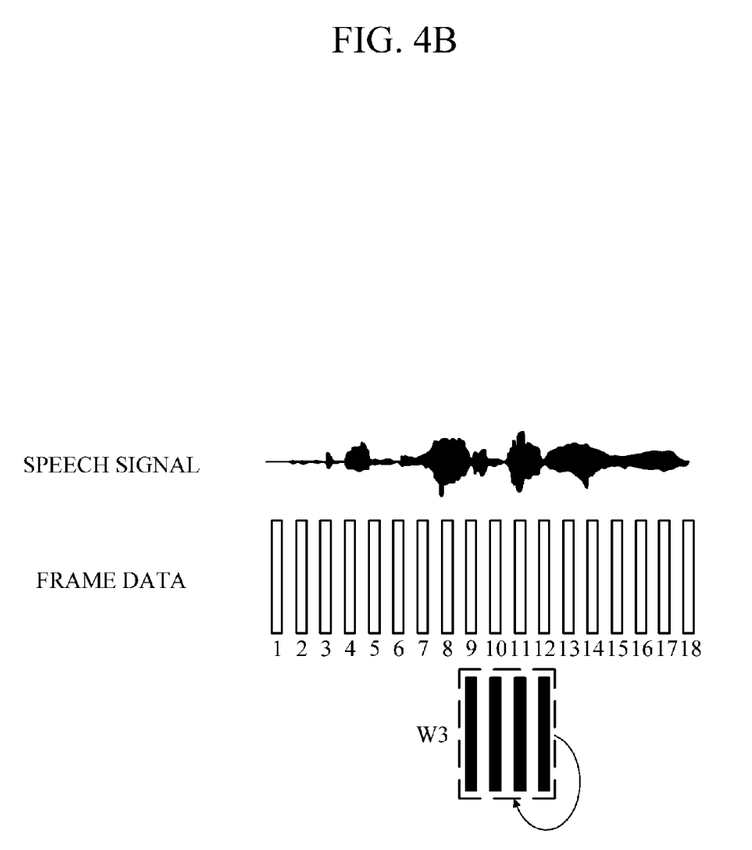

FIG. 4B shows an example of a normalization method performed by the normalizer 220 in which the normalizer 220 performs normalization in consideration of only frames 9, 10, 11, and 12 belonging to a current window W3. This example may be applied when a window size is set to be large enough for accurate speech recognition.

Figure 4C:
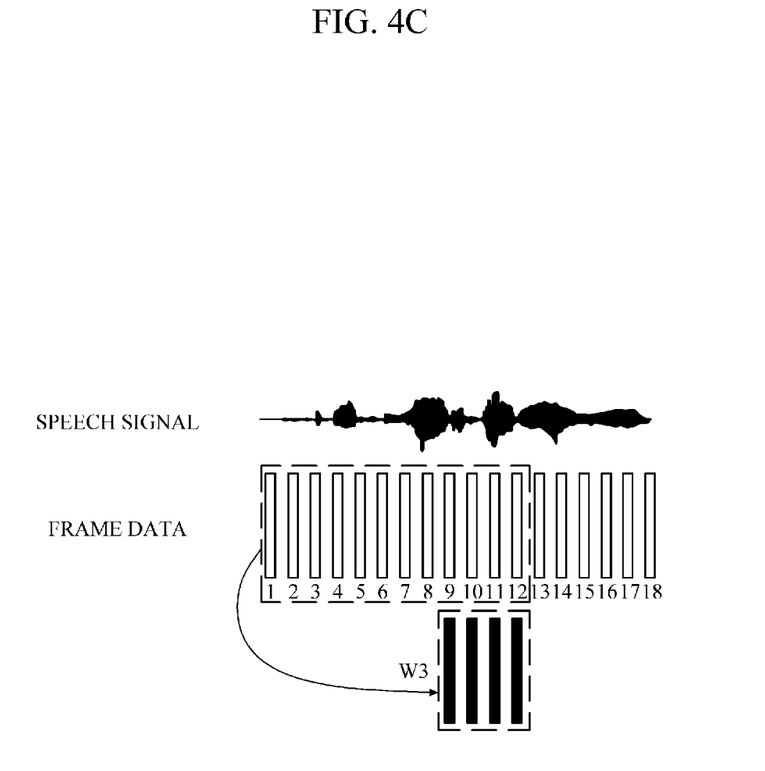

FIG. 4C shows another example of a normalization method performed by the normalizer 220 in which the normalizer 220 normalizes the current window W3 in consideration of frames belonging to preceding windows, that is, frames 1 to 8. In this example, Equation 1 is used to perform normalization.

Figure 4D:
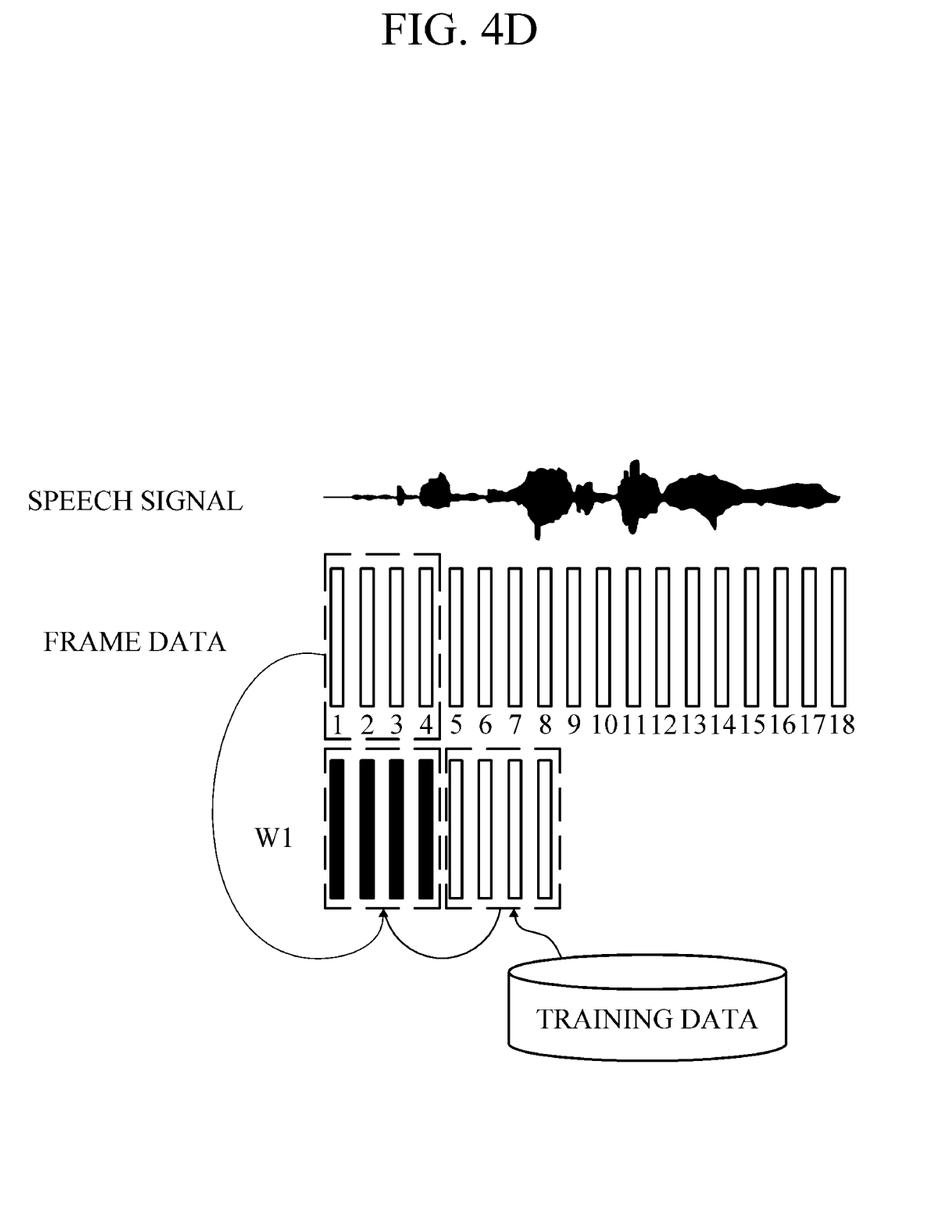

FIG. 4D shows an example of a normalization method performed by the normalizer 320. When a preset reference value is 8 and the first window W1 is extracted, the total number of extracted frames is currently four, that is, less than the reference value of 8, and thus the normalizer 320 acquires four frames, that is, the difference between the total number four of extracted frames and the reference value of 8, from training data and performs normalization in consideration of the four frames acquired from the training data. In this example, the normalizer 320 calculates the average and the standard deviation according to Equation 2, and performs normalization according to Equation 1 using the average and standard deviation calculated according to Equation 2.

Figure 5:
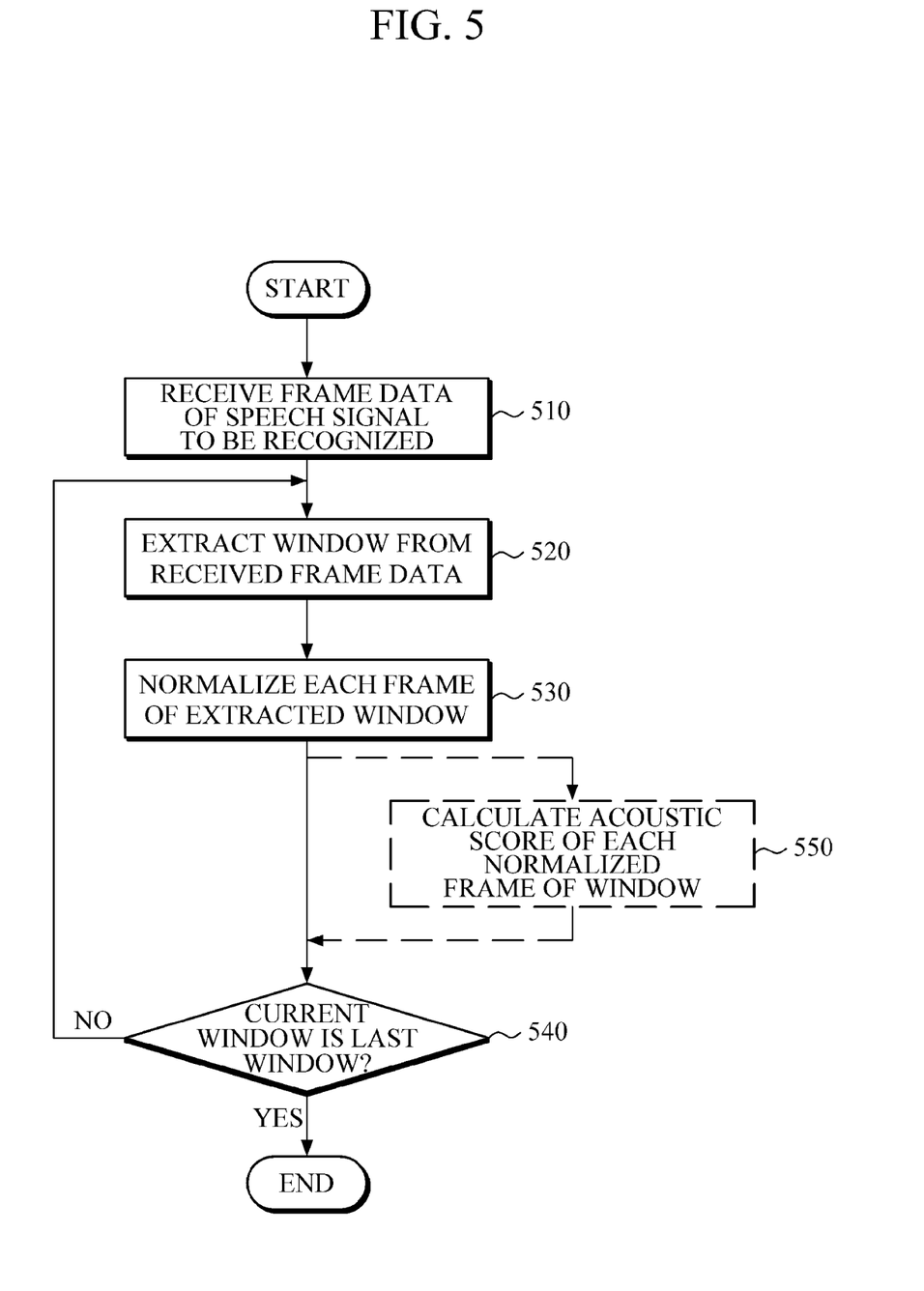
FIG. 5 is a flowchart of an example of a normalization method.

FIG. 5 is a flowchart of an example of a normalization method.

The normalization method of FIG. 5 is an example of a normalization method performed by the normalization apparatus 200 of FIG. 2. The normalization apparatus 200 sequentially receives frames of a speech signal to be recognized (510).

Subsequently, when a number of frames corresponding to a preset window size have been input while frames of the speech signal are being input, the normalization apparatus 200 extracts a window as frame data to be input to an acoustic model (520). The normalization apparatus 200 may add padding frames to both sides of the current extracted window (not shown).

Subsequently, when the window to be input to an acoustic model is extracted, the normalization apparatus 200 normalizes the current extracted window (530). When padding frames have been added to the current extracted window, the normalization apparatus 200 performs normalization in consideration of the padding frames. For more accurate speech recognition, the normalization apparatus 200 normalizes frames belonging to the current extracted window in consideration of information on frames belonging to all windows that have been previously extracted. In this case, Equation 1 is used for normalization. However, the normalization method is not limited to this case. It is possible to normalize the current extracted window only some of the preceding windows, and when a size of the current extracted window is large enough for normalization, it is also possible to normalize the current extracted window using only the frames belonging to the current extracted window.

Subsequently, the normalization apparatus 200 determines whether there is another window to be extracted, that is, whether the current extracted window is the last window (540). When the current extracted window is not the last window, the process proceeds to operation 520 in which the normalization apparatus 200 extracts the next window.

After normalization is performed on the current extracted window in operation 530, the speech recognition apparatus 100 of FIG. 1 may calculate acoustic scores by inputting the normalized frames belonging to the window into an acoustic model (550).

Figure 6:
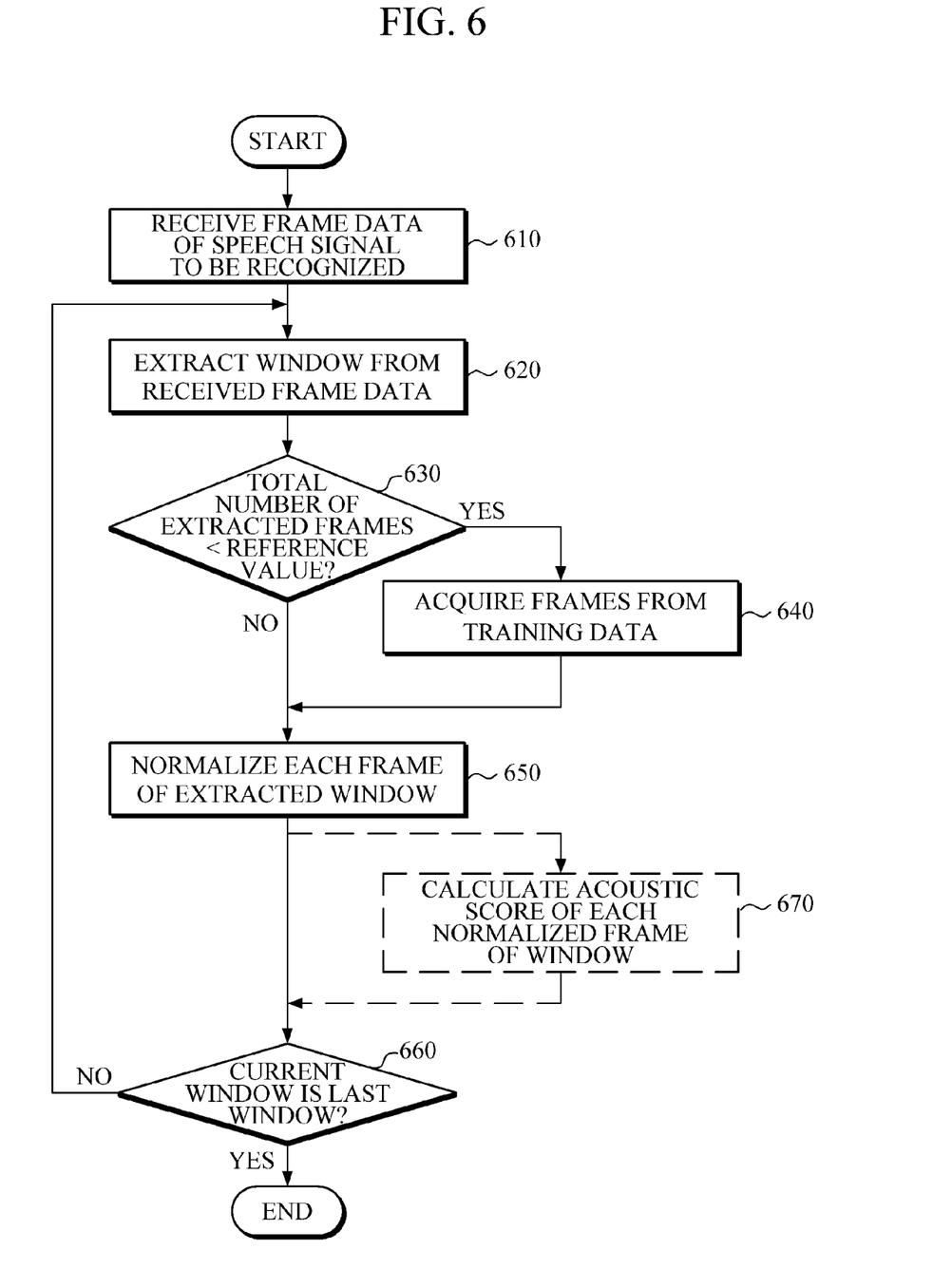
FIG. 6 is a flowchart of another example of a normalization method.

FIG. 6 is a flowchart of another example of a normalization method.

The normalization method of FIG. 6 is an example of a normalization method performed by the normalization apparatus 300 of FIG. 3. The normalization apparatus 300 sequentially receives frames of a speech signal to be recognized (610).

Subsequently, when a number of frames corresponding to a preset window size have been input while frames of the speech signal are being input, the normalization apparatus 300 extracts a window as frame data to be input to an acoustic model (620). The normalization apparatus 300 may add padding frames to both sides of the current extracted window (not shown).

Subsequently, the normalization apparatus 300 determines whether there is sufficient information to normalize frames belonging to the current extracted window (630). For example, the normalization apparatus 300 compares a total number of frames that have been extracted, that is, a total number of frames including the first frame belonging to the first extracted window to the last frame belonging to the current extracted window with a preset reference value, and determines that there is insufficient information when the total number of frames is less than the reference value.

When it is determined that there is insufficient information to normalize the frames, the normalization apparatus 300 acquires additional frames from training data (640). For example, the normalization apparatus 300 acquires a number of frames corresponding to the difference between the reference value and the total number of frames that have been extracted from the training data.

Subsequently, the normalization apparatus 300 normalizes the frames belonging to the current extracted window in consideration of the frames of the preceding windows and the frames acquired from the training data (650). The normalization apparatus 300 calculates the average and the standard deviation according to Equation 2, and performs normalization according to Equation 1 using the average and the standard deviation calculated according to Equation 2.

Subsequently, the normalization apparatus 300 determines whether there is another window to be extracted next, that is, whether the current extracted window is the last window (660). When the current extracted window is not the last window, the process proceeds to operation 620 in which the normalization apparatus 300 extracts the next window.

When normalization is performed on the current extracted window in operation 650, the speech recognition apparatus 100 of FIG. 1 may calculate acoustic scores by inputting the frames belonging to the window into an acoustic model (670).

Figure 7:
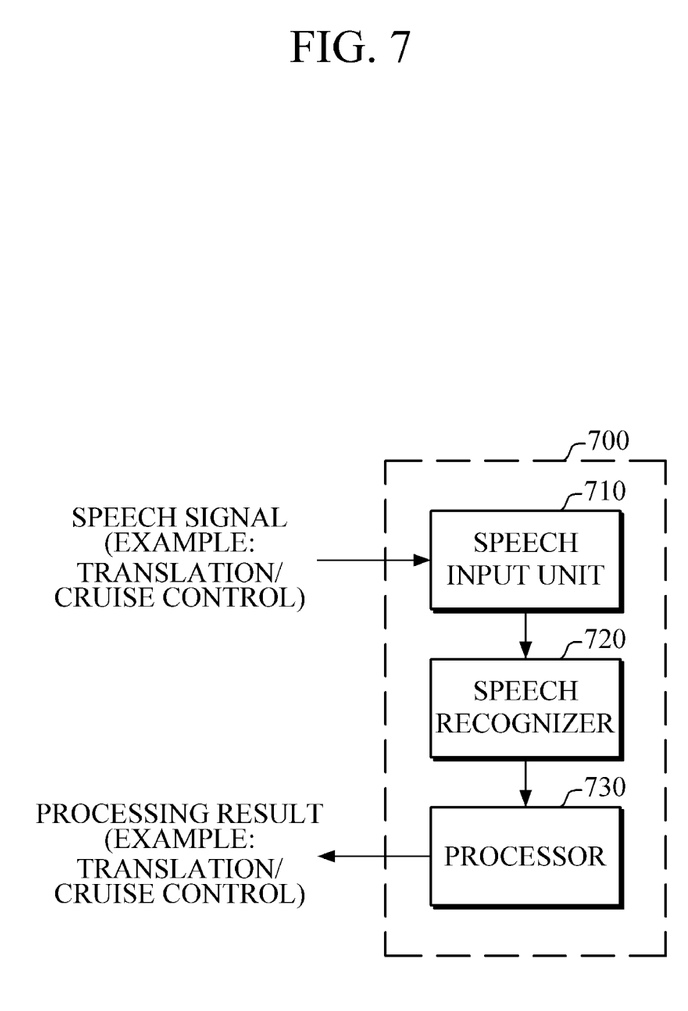
FIG. 7 is a block diagram of an example of an electronic device employing speech recognition technology.

FIG. 7 is a block diagram of an example of an electronic device employing speech recognition technology.

Referring to FIG. 7, an electronic device 700 includes a speech input unit 710, a speech recognizer 720, and a processor 730. The speech recognizer 720 may be the speech recognition apparatus 100 of FIG. 1.

The speech input unit 710 receives a speech signal input by a user through a microphone of the electronic device 700. The speech signal of the user may be related to execution of commands embedded in the electronic device 700, translation or interpretation of the speech signal into another language, TV control, vehicle cruise control, or navigation control.

When frames of the input speech signal are sequentially input, the speech recognizer 720 extracts windows to be input to an acoustic model from the input frame data. The speech recognizer 720 performs normalization in units of the extracted windows, and when padding frames are added to both sides of the windows, normalizes the windows together with the added padding frames. Also, when normalization is performed in units of windows, the speech recognizer 720 inputs the normalized windows to an acoustic model and a language model, gradually interprets acoustic scores and language scores, and outputs a recognition result.

When the speech recognition result is output, the processor 730 performs an operation corresponding to the speech recognition result. For example, the processor 730 may output the speech recognition result with a voice or in the form of text on a display and perform an operation of processing a command (e.g., TV control, such as power on/off and volume control, vehicle cruise control, or navigation control) embedded in the electronic device 700. Also, the processor 730 may perform translation/interpretation. However, operations of the processor 730 are not limited thereto, and the processor 730 may be used in various fields other than those mentioned above.

The speech recognition apparatus 100, the preprocessor 110, the acoustic score calculator 120, the language score calculator 130, and the interpreter 140 in FIG. 1, the normalization apparatus 200, the window extractor 210, and the normalizer 220 in FIG. 2, the normalization apparatus 300, the window extractor 310 and the normalizer 320 in FIG. 3, and the electronic device 700, the speech input unit 710, the speech recognizer 720, and the processor 730 in FIG. 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5 and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various modifications may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for normalizing input data of an acoustic model, the apparatus comprising:
   a window extractor configured to extract windows of frame data to be input to the acoustic model from frame data of a speech to be recognized; and
   a normalizer configured to normalize the frame data to be input to the acoustic model in units of the extracted windows,
   wherein the normalizer is configured to normalize frames belonging to a current window in consideration of frames belonging to preceding windows of the current window.

2. The apparatus of claim 1, wherein the window extractor is further configured to consecutively extract the windows in units of a predetermined number of frames of the frame data of the speech to be recognized while the frame data of the speech to be recognized is being input.

3. The apparatus of claim 1, wherein the normalizer is further configured to normalize frames belonging to the current window together with padding frames added to both sides of the current window.

4. The apparatus of claim 1, wherein the normalizer is further configured to normalize the frames belonging to the current window in consideration of the frames belonging to the preceding windows and frames of training data in response to a total number of the frames belonging to the current window and of the frames belonging to the preceding windows being insufficient for speech recognition.

5. The apparatus of claim 4, wherein the normalizer is further configured to acquire a number of frames corresponding to a difference between the total number of the frames and a reference value from the training data in response to the total number of the frames being less than the reference value.

6. The apparatus of claim 1, wherein the normalizer is further configured to normalize the frame data belonging to the extracted windows so that the frame data belonging to the extracted windows has an average of 0 and a standard deviation of 1.

7. A method of normalizing input data of an acoustic model, the method comprising:

extracting windows of frame data to be input to the acoustic model from frame data of a speech to be recognized; and normalizing the frame data to be input to the acoustic model in units of the extracted windows, wherein the normalizing of the frame data comprises normalizing frames belonging to a current window in consideration of frames belonging to preceding windows of the current window.

8. The method of claim 7, wherein the extracting of the windows comprises consecutively extracting the windows in units of a predetermined number of frames of the frame data of the speech to be recognized while the frame data of the speech to be recognized is being input.

9. The method of claim 7, wherein the normalizing of the frame data comprises normalizing frames belonging to the current window together with padding frames added to both sides of the current window.

10. The method of claim 7, the normalizing of the frame data comprises normalizing the frames belonging to the current window in consideration of the frames belonging to the preceding windows and frames of training data in response to a total number of the frames belonging to the current window and of the frames belonging to the preceding windows being insufficient for speech recognition.

11. The method of claim 10, wherein the normalizing of the frame data comprises:
comparing the total number of the frames belonging to the current window and the preceding windows with a reference value in response to the current window being extracted; and
acquiring a number of frames corresponding to a difference between the total number of the frames and the reference value from the training data in response to the total number of the frames being less than the reference value.

12. The method of claim 7, wherein the normalizing of the frame data comprises normalizing the frame data belonging to the extracted windows so that the frame data belonging to the extracted windows has an average of 0 and a standard deviation of 1.

13. A non-transitory computer-readable medium storing instructions that, when executed by a processor, cause the processor to perform the method of claim 7.

14. A speech recognition apparatus comprising:
a preprocessor configured to:
extract windows of frame data to be input to an acoustic model from frame data of a speech to be recognized; and
normalize the frame data to be input to the acoustic model in units of the extracted windows;
an acoustic score calculator configured to calculate acoustic scores in units of the normalized windows using the acoustic model based on a deep neural network (DNN); and
an interpreter configured to:
interpret the acoustic scores calculated in units of the normalized windows; and
output a recognition result of the speech to be recognized based on the interpreted scores,
wherein the preprocessor is further configured to normalize frames belonging to a current window in consideration of frames belonging to preceding windows of the current window.

15. The speech recognition apparatus of claim 14, wherein the preprocessor is further configured to normalize the frames belonging to the current window in consideration of the frames belonging to the preceding windows and frames of training data in response to a total number of the frames belonging to the current window and of the frames belonging to the preceding windows being insufficient for speech recognition.

16. The speech recognition apparatus of claim 14, wherein the interpreter is further configured to output a recognition result of the current window as a final recognition result of a whole speech to be recognized in response to a predetermined condition being satisfied or an input of a user while input of the speech to be recognized is under way.

17. The speech recognition apparatus of claim 14, wherein the DNN is a bidirectional recurrent deep neural network (BRDNN).

18. The speech recognition apparatus of claim 14, further comprising a language score calculator configured to calculate language scores using a language model;
wherein the interpreter is further configured to output the recognition result based on the interpreted scores and the language scores.

19. An apparatus for normalizing input data of an acoustic model, the apparatus comprising:
a window extractor configured to extract windows of frame data to be input to the acoustic model from frame data of a speech to be recognized; and
a normalizer configured to normalize the frame data to be input to the acoustic model based on results of a determination that an amount of frame data to enable speech recognition is determined sufficient.

20. The apparatus of claim 19, wherein the normalizer is further configured to normalize the frame data based on frames of all of the extracted windows from a first extracted window to a current extracted window.

21. The apparatus of claim 19, wherein the normalizer is further configured to normalize the frame data based on frames of all of the extracted windows from a first extracted window to a current extracted window and frames of training data.

22. The apparatus of claim 21, wherein a number of the frames of the training data is equal to a difference between a total number of the frames of all of the extracted windows from the first extracted window to the current extracted window and a reference value denoting a minimum number of frames to enable speech recognition.

23. The apparatus of claim 19, wherein the normalizer is further configured to normalize frames of a current extracted window each time a window is extracted.

* * * * *